E. J. WILLIS.
PLANIMETER.
No. 11,568. Reissued Sept. 22, 1896.
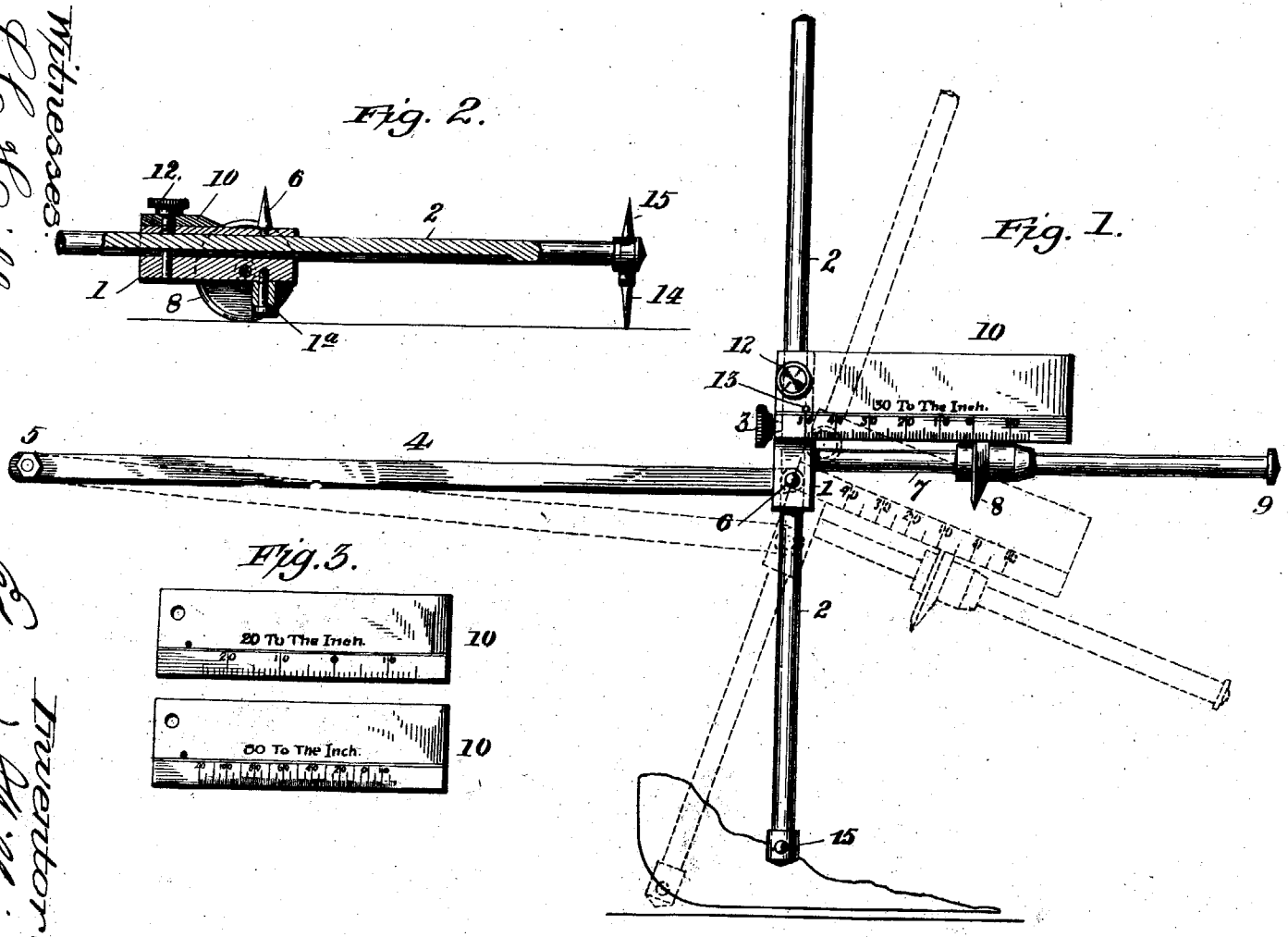
Witnesses:
L. C. Hills.
Alfred T. Page.
Inventor:
Edward J. Willis,
by R. E. Redman
his Atty.

UNITED STATES PATENT OFFICE.

EDWARD J. WILLIS, OF RICHMOND, VIRGINIA.

PLANIMETER.

SPECIFICATION forming part of Reissued Letters Patent No. 11,568, dated September 22, 1896.

Original No. 529,008, dated November 13, 1894. Application for reissue filed March 20, 1896. Serial No. 584,193.

*To all whom it may concern:*

Be it known that I, EDWARD J. WILLIS, a citizen of the United States, residing at Richmond, in the county of Henrico and State of Virginia, have invented certain new and useful Improvements in Planimeters; and I do hereby declare the following to be a full, clear, and exact description thereof, such as will enable others skilled in the art to which it appertains to make and use the same, reference being had to the accompanying drawings, and to the figures of reference marked thereon, which form a part of this specification.

My invention relates to certain improvements in polar planimeters for ascertaining areas and determining the mean effective pressure and horse-power of steam-indicator diagrams.

It is the aim of my invention to simplify and improve the construction and operation of apparatus of this type in such manner as to enable the user to read the mean effective steam-pressure or horse-power direct from the scale attached to the instrument without calculation of any kind and without application of measurements to the diagram.

It is my purpose also to provide means whereby the instrument may be used to determine mean effective pressures, horse-powers, or irregular areas upon different scales of measurement; and my invention consists in the novel features of construction and new combination of parts hereinafter fully described, and then particularly pointed out and defined in the claims.

To enable those skilled in the art to which my said invention pertains to fully understand the same, I will describe said invention in detail, reference being had for this purpose to the accompanying drawings, in which—

Figure 1 is a plan view showing a planimeter constructed in accordance with my invention and applied to a steam-indicator diagram to ascertain the mean effective pressure indicated, the dotted lines indicating a second position of the parts. Fig. 2 is a partial sectional view of the parts shown in Fig. 1, taken in the line of the tracer-bar; and Fig. 3 is a detail view showing different interchangeable scales constructed for application to the planimeter to adapt it to be used upon diagrams taken with springs of different scale.

The reference-numeral 1 in said drawings indicates the frame of the instrument, consisting, substantially, of a plain rectangular housing having a longitudinal opening which receives the tracer-bar 2. A set-screw 3 fastens the latter at any point to which it may be adjusted in the frame, the latter being open at both ends to allow the maximum longitudinal movement of the tracer-bar. In a boss dropped from the lower side of the frame 1 is a pivoted axis $1^a$ for the end of the fulcrum-bar 4, the other extremity of the latter being provided with a sharp point 5, of steel or other suitable metal, the body of which is extended through and rises above the end of the bar. Projecting from the upper side of the frame 1 is a small conical point 6, having its apex in the same straight line with the axis upon which the end of the fulcrum-bar 4 is mounted.

The reference-numeral 7 indicates a fixed shaft which extends from the side of the frame 1, opposite that upon which the fulcrum-bar 4 lies, the axis of the shaft being at an angle of ninety degrees with the longitudinal line of the frame and tracer-bar. Upon this shaft is placed the measuring-wheel 8, accurately fitting the shaft, but capable of turning freely and moving longitudinally from end to end thereof, the end of the shaft being provided with a slight enlargement 9, which prevents the wheel from passing off. The periphery of the latter is beveled off to an edge not keen enough to cut, but having such a sharp definition that it may readily be placed in exact coincidence with the graduations of a linear scale.

An attachable scale 10 is mounted upon the upper side of the frame 1, to which it is rigidly secured by a thumb-screw 12, passing through an opening in its end and tapped into the metal of the frame. A dowel or nipple 13, rising from the frame near the thumb-screw, enters a small aperture in the scale and determines the exact position of the same, its graduated edge lying in parallelism with the axis of the shaft 7 and in close proximity to, but just removed from actual contact with, the edge of the measuring-wheel 8.

I provide a series of different scales, two of which are shown in Fig. 3 of the drawings. These scales differ from each other only in graduation, this being varied to correspond with the various measurements for which the instrument is adapted. For example, one series may be graduated to correspond to the different-scales of springs with which indicator-diagrams are taken, others may be so graduated as to read directly the horse-power of certain engines when running at a given speed and the indicator-card taken with a specified spring, thus saving the usual tedious calculation of horse-power, while other scales may be graduated to conform to the cubic measurement, or, if desired, to the metric and other systems used abroad.

The end of the tracer-bar is supplied with a tracing-point 14, projecting from its lower surface. Upon the upper face of the same bar is a nipple 15, used in guiding the tracing-point. The end of this nipple is tapered to a point which lies in the same axial line with the tracing-point and which serves, in conjunction with the conical point 6, to fix the adjustment of the tracer-bar in the frame 1.

When the planimeter is used for determining the mean effective pressure of an indicator-diagram, the scale corresponding to the spring used in taking the diagram is attached to the instrument. Thus supposing the indicator-card to have been taken with a thirty-pound scale, then the scale with thirty graduations to the inch is attached to the instrument. The tracer-bar is then moved longitudinally in the frame 1 until the point of the nipple 15 and the conical point 6 are brought into coincidence with the length of the diagram to be measured. The fulcrum-bar 4 being then extended and at its point 5 caused to pierce the surface on which the instrument rests, the measuring-wheel 8 is moved along the shaft 7 until its edge coincides with the zero-mark on the graduated scale, which is preferably arranged in or near the central part of the graduated edge. The tracing-point is then caused to follow the diagram accurately, beginning at any point, care being taken to see that the measuring-wheel remains in contact with the surface over which it moves. This contact communicates rotary movement to the wheel and causes it to traverse the shaft 7 longitudinally in both directions, its edge moving as it recedes from or approaches the frame 1 over the scale 10. When the tracing-point 14 returns to its point of departure on the diagram, the edge of the wheel will coincide with a graduation of the scale, indicating in pounds the mean effective pressure. The fractions of a pound may be denoted by a vernier.

Prior to my invention planimeters have employed measuring-wheels having a rotary movement, the indications given thereby being merely the height of the line denoting the mean effective pressure on the diagram. So far as I am aware there has been no provision made heretofore for reading the mean effective pressure in pounds and fractions of a pound direct from the scale of the instrument. Neither am I aware of any instance in which the instrument has been so organized as to permit the use of interchangeable scales or the reading of horse-powers directly from the instrument. As the indicator-scales are obtainable at a small cost and are readily fitted, the expense of manufacture is not materially increased and the usefulness of the instrument is largely increased, while its accuracy is strictly preserved.

This planimeter differs primarily from all previously-formed planimeters in having the axis of the measuring-wheel perpendicular or at right angles to the tracer-arm and the wheel rotatable on the axis parallel to the tracer-arm and longitudinally movable thereon perpendicular to the said arm, and, furthermore, in having the reading-scale arranged parallel with the axis of the measuring-wheel, so that the wheel may move along the scale parallel therewith and enable the reading to be made direct from the scale, as indicated thereon by the measuring-wheel.

The equation upon which the instrument is organized according to my invention is substantially as follows: If A be taken to represent the superficial area of a diagram, M denoting the movement of the measuring-wheel, and L the length of the tracer-arm, (which is adjusted to the length of the diagram,) then $A=M\times L$, and the mean effective pressure will be equal to $\frac{A}{L}$. Representing this pressure by the letters M.E.P., the equation will read $M.E.P.=\frac{A}{L}$, or, clearing the denominator, $A=(M.E.P.)L$. Substituting $(M.E.P.)L=M\times L$, whence $M.E.P.=M$; that is to say, the mean effective pressure is equal to the movement of the measuring-wheel, which is read in pounds per square inch by the same scale as that of the spring with which the card is taken. Thus, if the card be taken with a fifty-pound spring, then the mean effective pressure (M) is measured in pounds per square inch by a scale with fifty graduations to the inch.

When used for measuring areas, the points 6 and 15 are set apart the distance corresponding to the scale which is attached to the instrument. Thus, if a scale with thirty graduations to the inch be on the planimeter, the points 6 and 15 are set three inches apart and the areas read in square inches. If the scale with one hundred graduations to the inch be attached, then the points 6 and 15 should be ten inches apart, and reading will be in square inches. Similarly for foreign measures, and if a centimeter-scale were attached with ten graduations per centimeter and points 6 and 15 be ten centimeters ap[illegible] it would read in square centimeters.

To obtain horse-power direct from the scale it is necessary to have a scale or set of scales so graduated as to read the horse-powers of the engine or engines from which the cards are taken with a specified spring. Thus if we had a card taken with a fifty-pound spring from a twelve-inch by eighteen-inch engine running at one hundred and forty-eight revolutions per minute, and we were to use a scale with seventy-five graduations per inch, the reading of the instrument would be the horse-power of the engine, for the constant by which we would multiply its mean effective pressure to obtain its horse-power is 1.5, and since, as per previous paragraphs, a scale with fifty graduations to the inch would read the mean effective pressure, a scale with seventy-five graduations to the inch would read 1.5 times the mean effective pressure, which is the horse-power.

I am not confined to the particular form of the scale employed nor to the manner in which the scales are secured in place nor in which they are rendered interchangeable or replaceable, as various forms may be employed in which will be embodied the feature of replaceability or interchangeability of scales.

By the statement in the specification and claims that the measuring-wheel axis, or the shaft on which the measuring-wheel moves, shall be perpendicular or at right angles to the tracer-bar is meant that the wheel-axis shall be perpendicular to the line joining the guide-point and the tracer-point of the tracer arm or bar.

Having described my invention and set forth its merits, what I claim is—

1. A polar planimeter comprising a measuring-wheel whose axis is perpendicular to the tracer-bar and having rotary and longitudinal movement on a fixed shaft, a fulcrum-bar, and a graduated scale over the straight edge of which the periphery of the wheel moves, substantially as and for the purposes set forth.

2. A polar planimeter comprising a measuring-wheel having rotary and longitudinal movement on a fixed shaft, a fulcrum-bar, and a scale replaceably attached to the frame to permit an interchange of scales and over the straight edge of which the periphery of the wheel moves, substantially as and for the purposes set forth.

3. A polar planimeter having a measuring-wheel loosely mounted on a fixed shaft at right angles to the tracer-bar, and a replaceable scale adapted to be mounted on the frame in parallelism with said fixed shaft, and to be replaced by a different scale, substantially as and for the purposes set forth.

4. In a polar planimeter, the combination with a frame, of a pivotally-attached fulcrum-bar, a longitudinally-adjustable tracer-bar, a measuring-wheel turning and moving longitudinally upon a shaft at right angles to the tracer-bar, and an attachable and detachable scale mounted on the frame with its straight graduated edge lying in close proximity to the edge of the measuring-wheel and in parallelism with its shaft, substantially as and for the purposes set forth.

5. A planimeter comprising a tracer-bar, a measuring-wheel axis perpendicular to the tracer-bar, a measuring-wheel having a rotatable movement on its axis parallel to the tracer-bar and a longitudinal movement thereon perpendicular to the tracer-bar, and a scale along which the wheel moves, substantially as and for the purposes set forth.

6. A planimeter comprising a tracer-bar, a shaft perpendicular to said bar, a replaceable or interchangeable scale extending longitudinally of said shaft, and a measuring-wheel having a rotatable movement on said shaft and a longitudinal movement along the same and parallel to said scale, substantially as and for the purposes described.

7. A planimeter comprising an adjustable tracer-bar, a measuring-wheel axis perpendicular to the tracer-bar, a measuring-wheel having a rotatable movement on its axis parallel to the tracer-bar and a longitudinal movement thereon perpendicular to the tracer-bar, and a scale along which the wheel moves, substantially as and for the purposes set forth.

In testimony whereof I affix my signature in presence of two witnesses.

EDWARD J. WILLIS.

Witnesses:
NATHAN H. ROBBINS,
ALFRED T. GAGE.